United States Patent
Gilbert

[15] 3,698,775

[45] Oct. 17, 1972

[54] MAGNETIC SUPPORT AND MOTOR STRUCTURE

[72] Inventor: Roswell W. Gilbert, New York, N.Y.

[73] Assignee: Technical Management Services, Inc., Westfield, N.J.

[22] Filed: April 1, 1970

[21] Appl. No.: 24,665

[52] U.S. Cl..................................................308/10
[51] Int. Cl..............................................F16c 39/06
[58] Field of Search.....308/10; 73/505, 517; 74/5.41

[56] References Cited

UNITED STATES PATENTS

| | | | |
|---|---|---|---|
| 2,888,256 | 5/1959 | Sedgfield | 73/517 |
| 3,124,962 | 3/1964 | Hirtreiter | 308/10 |
| 3,175,405 | 3/1965 | Doyle | 308/10 |
| 3,243,238 | 3/1966 | Lyman | 308/10 |
| 3,493,274 | 2/1970 | Emslie | 308/10 |
| 3,508,444 | 4/1970 | Sitomer | 308/10 |

Primary Examiner—D. F. Duggan
Assistant Examiner—R. Skudy
Attorney—Curtis, Morris & Safford

[57] ABSTRACT

The motor has a magnetic bearing structure which suspends and holds the shaft of the motor out of contact with the shaft support structure, thus eliminating bearing lubrication and wear problems and making it possible to operate the device in a vacuum. The shaft is permanently magnetized, and a positive feedback amplifier is used together with multiple coils to control an axial magnetic field and thus maintain the shaft in a position of equilibrium between the ends of the bearing structure, and to magnetically hold the shaft against transverse movement. Rotary drive force is applied to the rotor either by conventional means such as a wound rotor driven by a stator which develops a rotating magnetic field, or by simply causing the axial magnetic field to change with changes in the relative rotational positions of the shaft and the ends of the bearing structure.

16 Claims, 8 Drawing Figures

PATENTED OCT 17 1972　　3,698,775

INVENTOR
ROSWELL W. GILBERT

BY
Curtis, Morris + Safford
ATTORNEYS

MAGNETIC SUPPORT AND MOTOR STRUCTURE

This invention relates to magnetic support means, and electrical motors and bearing structures.

Bearing wear and the need for lubrication of the bearings long has caused problems, especially in high-speed electric motors, gyroscopes and the like. In particular, gyroscopes such as those used in inertial guidance systems for space craft have particularly severe bearing problems. In attempts to solve such problems, air bearing (bearings in which compressed air is used in place of the usual solid bearing) have been tried. However, in many instances the air used in forming the bearings causes considerable losses and errors in the guidance system. Extremely precise ball bearings also have been used. However, such bearings require lubrication. Since most known lubricants evaporate or deteriorate in a vacuum or at high temperatures, or become viscous and thus non-functional at very low temperatures, such bearings cannot be used for substantial lengths of time under such conditions. This means that the bearings must be enclosed in a pressurized compartment during space flight, or must be cooled or heated to avoid temperature extremes. Not only does this add weight, cost and complexity to the space craft, but it also can be a safety hazard since the guidance system will fail if the pressurization or temperature regulation system fails.

In accordance with the foregoing, it is an object of the present invention to provide a magnetic support and motor bearing structure which has no solid bearing surfaces and does not rely on pressurized gases for its performance. It is a further object of the present invention to provide such a device which does not require fluid lubrication and can operate in a vacuum as well as in a gaseous atmosphere. It is another object of the present invention to provide such a device which is relatively insensitive to temperature extremes, and which is compact and simple to construct and operate.

In accordance with the present invention, the foregoing objects are met by the provision of a motor and bearing structure in which a support member extends around a rotatable member or shaft, and magnetic suspension means are provided for magnetically suspending and holding the rotatable member against axial and transverse movement relative to the support member, and for holding the rotatable member out of contact with the support member. Rotary drive force is provided either by conventional means such as a squirrel-cage rotor driven by a stator which develops a rotating magnetic field, or by simply causing the axial magnetic field which is used to hold the rotatable member to change with changes in the relative rotational positions of the rotatable member and the support.

The foregoing and other objects and advantages will be described in and apparent from the following description and drawings.

Figure 1:
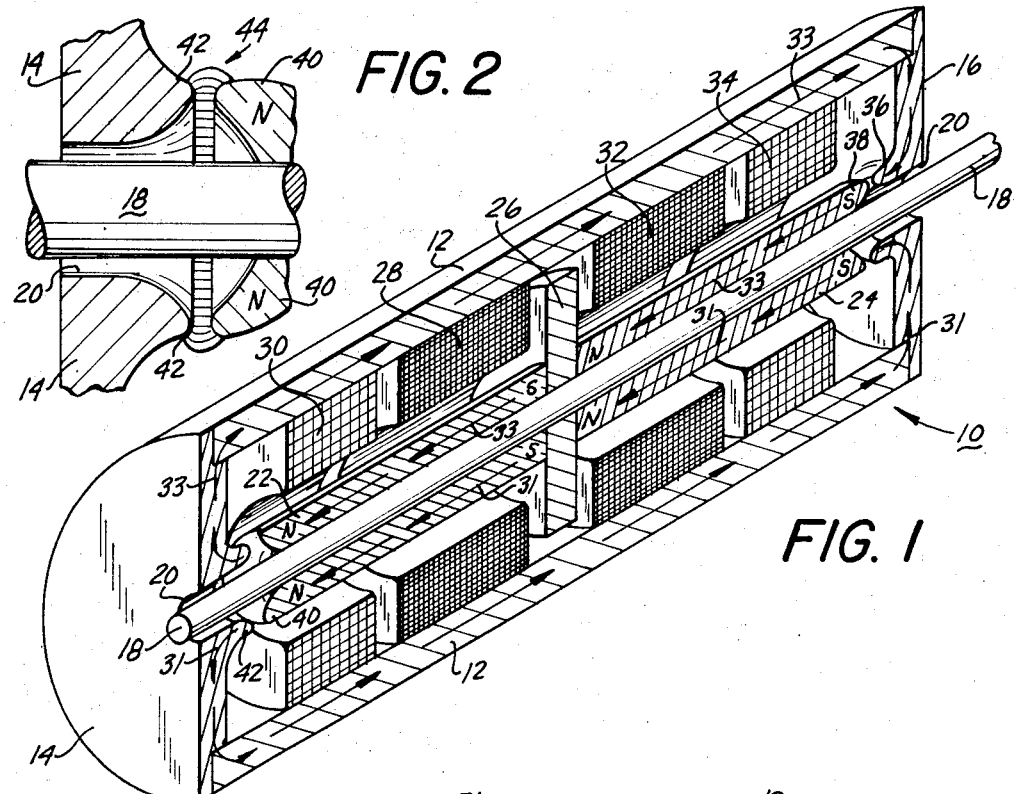
FIG. 1 is a perspective cross-sectional view of a bearing and support structure constructed in accordance with the present invention.

The bearing and support structure 10 shown in FIG. 1 includes a cylindrical housing 12 to which are attached two end plates 14 and 16. A cylindrical shaft 18 passes through holes 20 in the end plates 14 and 16. Two cylindrical permanent magnets 22 and 24 are secured to the shaft 18, and a separator plate 26 is secured in the center of the shaft to separate the magnets 22 and 24 from one another.

Two coils 32 and 34 are wound in cylindrical form on the inside of the housing 12 and are surrounding but spaced from the cylindrical permanent magnets 22 and 24. Two additional coils 28 and 30 are similarly wound about the magnet 22. The coils 28 and 32, which are named "drive" coils, are located next to the separator plate 26, with the plates 26 extending between those two coils. The coils 30 and 34, which are named "sense" coils are located near the ends of the respective magnets 22 and 24.

The cylinder 12, the end plated 14 and 16, and the separator plate 26 are all made of magnetically permeable material such as steel. As is shown most clearly in FIG 2, the ends 38 and 40 of the magnets 24 and 22 diverge outwardly from the shaft 18 and form a rounded, relatively sharp edge at a distance from the surface of the shaft 18. The end plates 14 and 16 have inwardly-extending annular projection 42 which are tapered to a rounded, relatively sharp edge at about the same distance from the axis 18 as the edge of the ends 38 and 40 of the permanent magnets.

As is shown in FIG. 1, the cylindrical permanent magnets 22 and 24 are aligned so that the south pole of magnet 22 is adjacent the north pole of magnet 24; that is, the flux created by both magnets is in the same direction. With this arrangement, a substantially axially-directed flux field 44 (See FIG. 2) is created between the annular pole faces of the magnets and the annular projections 42. The gap between the annuli 40 and 42 and 36 and 38 preferably is quite small; i.e., 0.002 inch or thereabouts. The diameter of the separator plate 26 is substantially less than the inner diameter of the cylindrical housing 12 so that the gap between the separator plate 26 and the housing 12 is relatively large. Therefore, substantially all of the flux created by the permanent magnets flows along the paths indicated in FIG. 1 by the solid arrows 31 and 33; that is, the flux flows axially through the magnets and through the short gaps at the end of the magnet 22, through the end plate 14, through the outer shell 12, through the end plate 16 and the gap at the end of the magnet 24, and back through the second magnet 24. This prevents unduly large forces of attraction from being developed between the separator plate 26 and the housing 12, and thus avoids this potential source of imbalance for the shaft 18.

The flux field 44 between the ends of the magnets and the end plates of the bearing structure tend to hold the shaft 18 against transverse motion. That is, if the shaft should try to move transversely towards any of the sides of either of the openings 20 in the end plates 14 and 16, the flux fields 44 will tend to pull the ends 40 and 38 of the magnets back into alignment at the edge 42 of the annulus at each end plate and thus will tend to hold the shaft forcibly against transverse or a lateral movement.

The shaft 18, but for the presence of another feature of the invention, would move axially either to the left or to the right (referring to FIG. 1) and come into full contact with either the left end plate or the right end plate because of the magnetic attraction between the magnets and the end plates. Even though the magnetic bias flux produced by each magnet 22 and 24 is made as nearly equal to the flux of the other magnet as possible, the shaft 18 is in a position of unstable equilibrium when it is midway between the two end plates and eventually it will be pulled towards one or the other of the end plates. The reason for this is that as one end approaches closer to one of the end plates the force of attraction between that magnet and the end plate increases while, as the opposite end moves away from its end plate, the force of attraction between those two members decreases. Thus, the magnets and shaft 18 rapidly would move into contact with one of the end plates, but for this further feature of the invention.

Figure 3:
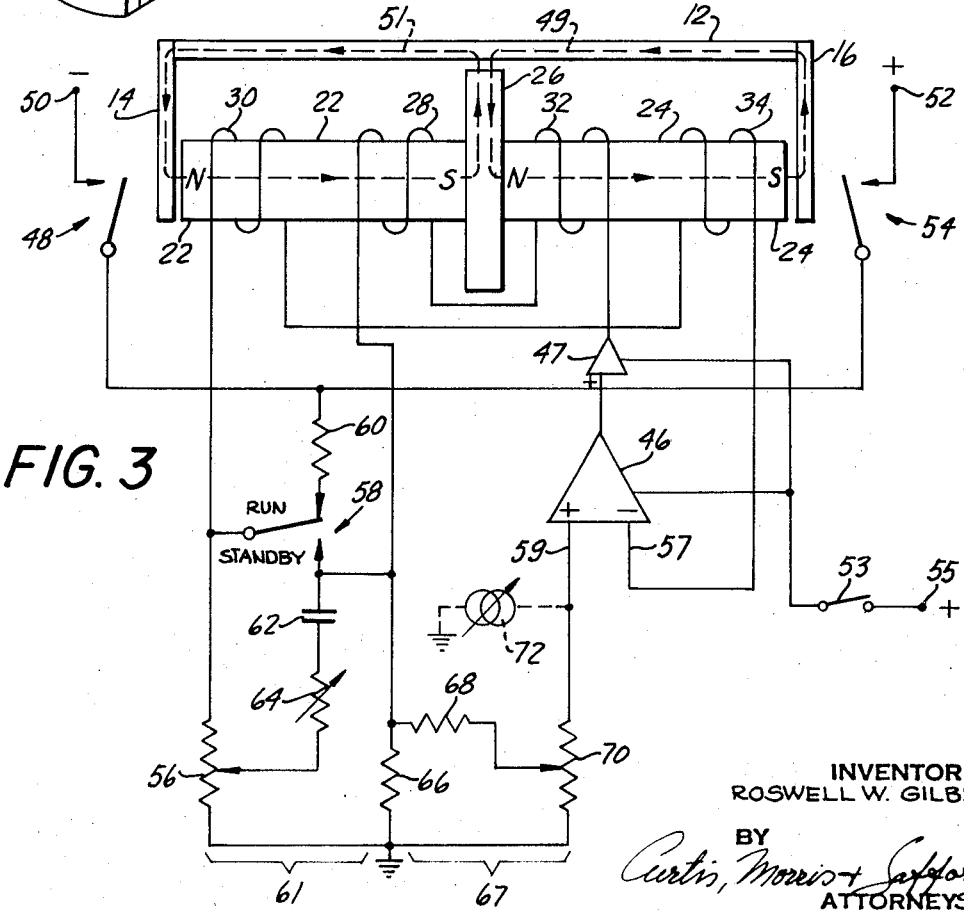
FIG. 3 is an electrical schematic circuit diagram for the device shown in FIGS. 1 and 2.

The axial position of the shaft 18 is stabilized by means of the electrical and magnetic circuit arrangement illustrated schematically in FIG. 3. In this circuit, which uses some of the principles disclosed in my U.S. Pat. No. 2,946,930, the drive windings 28 and 32 are connected together in series and are wound in opposite directions around the magnets 22 and 24. The sense windings 30 and 34 similarly are connected in series and are wound in opposite directions. Thus, a current flowing through the drive windings will develop flux of opposite polarities in the two magnets 22 and 24. Similarly, a change in flux level in the magnets will cause electrical signals of opposite polarity to be developed across the sense windings 30 and 34.

It is assumed, for the purposes of the present explanation, that a switch 58 which is provided for purposes to be described below is in its "RUN" position as shown in FIG. 3. Also, it is assumed that the amplifiers 46 and 47 have been energized by the closing of a switch 53 which connects both amplifiers to a DC power supply indicated at 55.

One end of the sense winding 34 is connected to the negative input terminal 57 of an operational differential amplifier 46. The other end of the sense winding pair is connected to a negative feed back and integrating network 61. One end of the drive winding pair is connected to the output of a DC power amplifier 47 which amplifies the output signal from the differential amplifier 46. The other end of the drive winding pair is connected to the positive input terminal 59 of the differential amplifier 46 through a positive feedback network indicated generally at 67.

Each of the sense windings 30 and 34 detects changes in the flux levels in the magnets 22 and 24 caused by changes such as changes in the axial positions of the magnets. The changes in flux levels in the magnets 22 and 24 develop voltages across the sense windings 30 and 34 which either increase or decrease the signal level on the input lead 57 of amplifier 46, depending upon whether the flux level in magnet 24 increases while the flux level in magnet 22 decreases, or vice-versa. The increase or decrease of the input signal level at input terminal 57 creates an output signal at the output of amplifier 46 which is amplified by the power amplifier 47. The output current from amplifier 47 flows through drive windings 32 and 28 and creates a flux which opposes the change of flux in each of the two magnets 22 and 24. Moreover, the positive feedback network 57 includes a resistor 66 having a relatively very low resistance (e.g., 0.1 ohm) which is connected to ground. A potentiometer 70 having a larger resistance (e.g., 100 ohms) is connected between the terminal 59 of the amplifier 46 and ground. The wiper arm of the potentiometer is connected through a relatively large (e.g., 10,000 ohms) resistor 68 to the upper terminal of resistor 66. The position of the wiper arm of the potentiometer 70 thus determines the portion of the voltage developed across resistor 66 which is fed back to the amplifier at terminal 59.

The voltage feedback to terminal 59 is fed back in a regenerative sense; i.e., it is a positive feed back voltage. This causes more energy to be supplied to the drive windings 28 and 32 so as to tend to restore the magnets 22 and 24 to their initial position. This positive feedback arrangement effectively results in the connection of a negative resistance to the drive windings. This solves the problem that forces of attraction between magnetic bodies increase with decreasing spacing between the bodies, a phenomenon which would dictate that the magnets could not be suspended in midair between the plates 14 and 15, but promptly would be pulled into contact with one of the plates.

Each of the windings 30 and 34 preferably has a relatively large number of turns of very fine (i.e., small-diameter) wire. For example, in a device which has been successfully built and tested, each of the coils 30 and 34 had 10,000 turns of No. 40 wire. The purpose of this is to permit the sense windings to develop relatively large output voltages in response to relatively small changes in flux levels in the magnets 22 and 24. However, the total resistance of each winding 30 and 34 is relatively high (e.g., 2,000 ohms), and this high resistance does not permit maximum power transfer from the amplifier 47 to the windings. Accordingly, separate low resistance drive windings 28 and 32 are provided. Windings 28 and 32 have relatively few turns of relatively thick wire and thus have a very low resistance. For example, in the device which has been successfully built and tested, each of the coils 28 and 32 has 400 turns of No. 28 wire whose total resistance is 8 ohms, a resistance which is quite well matched to that of the amplifier 47, thus providing maximum power transfer.

The feedback network 61 which is connected to the sense windings performs three different functions. First, it provides negative feedback which opposed the positive feedback signals developed across the resistor 66 and thus stabilizes the control circuit and tends to hold the magnets 22 and 24 in an equilibrium position mid-way between the end plates 14 and 16.

The circuit 61 also performs an integrating function; that is, a capacitor 62 is connected in series with a variable resistor 64 to the wiper arm of a potentiometer 56 which is connected between one terminal of the sense winding pair and ground. This circuit integrates the signal received from the sense windings to insure that the negative feedback signal is proportional to the flux imbalance in the magnets 22 and 24. That is, the voltage developed by the sense windings is proportional to the time-derivative of the flux, and the integration of that voltage makes the negative feedback voltage proportional to the flux.

The third function of the circuit 61 is to damp the oscillations of the magnets 22 and 24 as they are returning to an equilibrium position after having deviated from that position. Thus, the movement of the magnets is stabilized very rapidly. The potentiometer 56 provides means for varying the amount of damping which is provided by the circuit 61.

The differential flux produced in returning the magnets 22 and 24 to an equilibrium position flows in the paths indicated by dashed lines 49 and 51. That is, flux will flow through the magenet 22, through the separator plate 26, through the housing 12, the end plate 14, and back to the magnet 22. Similarly, flux flows through the magnet 44, the end plate 16, the housing 12, the separator plate 26, and back through the magnet 24. The direction of flow of flux in each of these separate flux paths reverses, depending upon the direction of imbalance of the magnets. When the magnets 22 and 24 are in a position of equilibrium between the end plates 14 and 16, differential flux does not flow in the circuit, and substantially all of the flux flowing is due to the permanent magnets 22 and 24 themselves.

In the specific circuit example described above, the capacitor 62 has a capacitance of 0.5 microfarad, the resistor 64 has a fixed resistance of 10,000 ohms in series with a variable resistance of 10,000 ohms; that is, the resistance of resistor 64 is variable between 10,000 ohms and 20,000 ohms. The resistance of potentiometer 56 is 1,000 ohms.

In accordance with another feature of the present invention, means are provided for automatically starting the balancing of the shaft 18 and the magnets 22 and 24 when they have been allowed to come to rest against one or the other of the end plates 14 and 16 due to deenergization of the control circuit.

A switch 58 is provided, with a resistor 60 being connected to one of the switch contacts, and then to the contact arms of two end switches 48 and 54. Switches 48 and 54 are positioned to be closed due to contact with the shaft 18 when it nears one of the end plates 14 or 16. The contact switch 54 is connected to a positive power supply 52, and the contact of switch 48 to a negative power supply 50.

Initially, before switch 53 is closed to energize the control circuit shown in FIG. 3, the shaft 18 and the magnets 22 and 24 will abut one or the other of the end plates 14 and 16 due to the fact that an equilibrium position between the two end plates is unstable unless the control circuit is used. In such a condition, one or the other of the switches 48 and 54 will be closed, thus supplying energy through the switch 58 when it is in its "RUN" condition. Initially, however, the switch 58 is switched to its "STANDBY" condition to supply negative feedback to the amplifier 46 to "center" the amplifier, in case it may have drifted to a large unbalanced condition. Then, when the amplifier 46 is centered, the switch 58 is returned to the "RUN" position, in which either positive or negative polarity direct current is used to charge the capacitor 62 and develop a current from the amplifiers 46 and 47 which will lift the magnets 22 and 24 from their rest position and into a position between the end plates 14 and 16. When the magnet is lifted from its rest position, the closed switch 48 or 54 opens, removing the direct current bias from the capacitor 62. At this point, the control circuit takes over and centers the magnets 22 and 24 at a position between the end plates 14 and 16.

An alternative to the start-up system described above is one in which the magnets 22 and 24 are biased by any conventional means (e.g., gravity) into contact with a preselected one of said end plates 14 and 16. With such an arrangement, the end switches could be eliminated, and a fixed bias could be supplied to the system to raise the magnets to a floating position.

Figure 4:
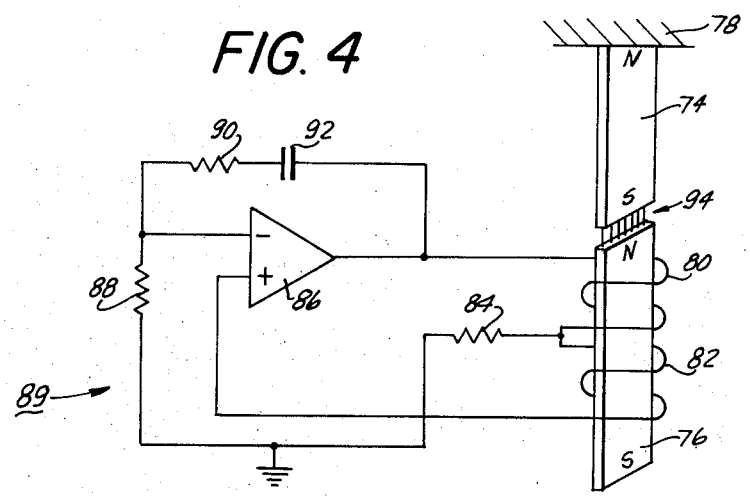
FIG. 4 is a schematic diagram of another embodiment of the present invention.

FIG. 4 shows schematically a simple motor structure constructed in accordance with the present invention. Additionally, FIG. 4 is used to illustrate the operational principles of a modification of the bearing structure shown in FIGS. 1 through 3 to convert it into a motor.

Figure 5:
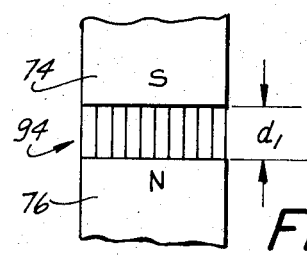
FIGS. 5 and 6 are further schematic views of the portion of the structure shown in FIG. 4 under differing operational conditions.

The motor shown in FIG. 4 includes a first magnet 74 secured to a stationary support surface 78. A movable magnet 76 is suspended below the fixed magnet 74 purely by magnetic forces which are controlled by means of a control circuit 89. The magnets 74 and 76 are rectangular bar magnets. The cross-sectional shape of each magnet thus deliberately is selected to be rotationally asymmetrical so that the flux-linkage between the two magnets changes with the relative rotational positions of the two magnets. That is, when the magnets 74 and 76 are aligned perfectly with one another as is shown in FIGS. 4 and 5, every portion of the end surface of each magnet is positioned directly opposite to a similar portion of the opposite magnet, so that there is maximum surface area for the coupling of flux 94 between the two magnets. However, when the movable magnet 76 is rotated 90° to the position shown in FIG. 6, the surface areas of the two magnets which are directly opposite to one another is greatly reduced, with the result that the shape of the flux flow path 94 is changed. As it will be explained in greater detail below, applicant has discovered that this phenomenon can be used to rotate the movable magnet 76.

The control circuit shown in FIG. 4 is similar to that shown in FIG. 3. It includes an operational differential amplifier 86 with a negative-feedback, damping and integrating circuit consisting of a capacitor 92 and a resistor 90 connected in series between the negative input terminal and the output terminal of amplifier 86. The output of amplifier 86 delivers current to a low-impedance drive winding 80 whose opposite end is connected through a very low impedance 84 to ground. The resistor 84 is also connected to one end of s a sense winding 82 which is wound in a direction opposite to winding 80 so that the flux developed by the coils 80 and 82 is in opposite directions. The opposite end of coil 82 is connected to the positive input terminal of the differential amplifier 86. This control circuit effectively connects a negative resistance to the drive winding so as to maintain the magnet 76 suspended in a stable condition beneath the magnet 74.

Figure 6:
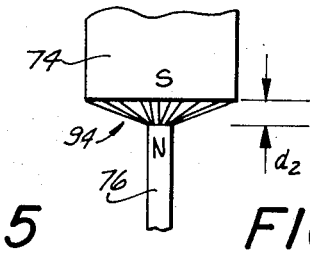

Referring again to FIGS. 5 and 6, when some small unbalancing force such as might be caused by a "noise" signal causes the magnet 76 to turn slightly from the aligned position with respect to magnet 74, the flux linkage between the two magnets is reduced. The results of this change is that the control circuit moves the two magnets closer together. The reason for this is that with a different flux linkage path, the equilibrium position of the magnets 76 is different. Specifically, as the flux linkage surface area between the two magnets decreases, the lower magnet 76 must be moved closer to the magnet 74. Thus, when the magnets are perfectly aligned as shown in FIG. 5, there is a distance $d_1$ separating the magnets. However, when the lower magnet is rotated through 90°, as is shown in FIG. 6, a significantly smaller distance $d_2$ separates the two magnets. The magnets 76 starts to sing first clockwise and then counterclockwise in an ever-increasing arc or less than 180°. Each swing is a little further than the preceding swing, due to the acceleration caused by positive feedback. Finally, one of the swings is large enough to swing the lower magnet past the 90° position shown in FIG. 6, with the result that the magnet 76 keeps rotating in the same direction. The magnet 76 then spins continuously while moving up and down in a sinusoidal pattern as it spins. Thus, a simple motor has been formed.

An important feature of the invention which makes operation as a motor possible is the shaping of the field between the magnets such that the magnetic coupling between the magnets will be different when the magnets are in different relative rotational positions. Thus, the magnets need not have the simple rectangular shape shown in FIG. 4, but can have a variety of other shapes which produce the results described above.

Figure 2:
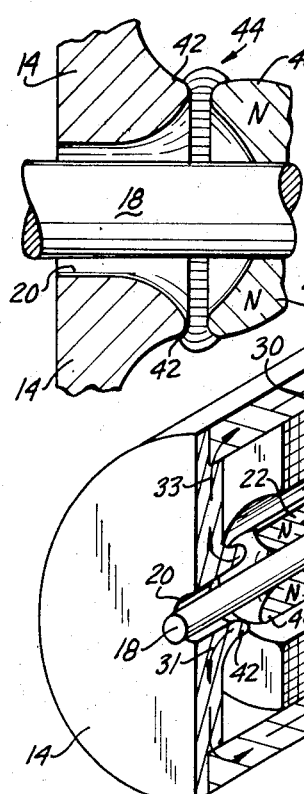
FIG. 2 is an enlarged broken-away view of a portion of the structure shown in FIG. 1.
Figure 7:
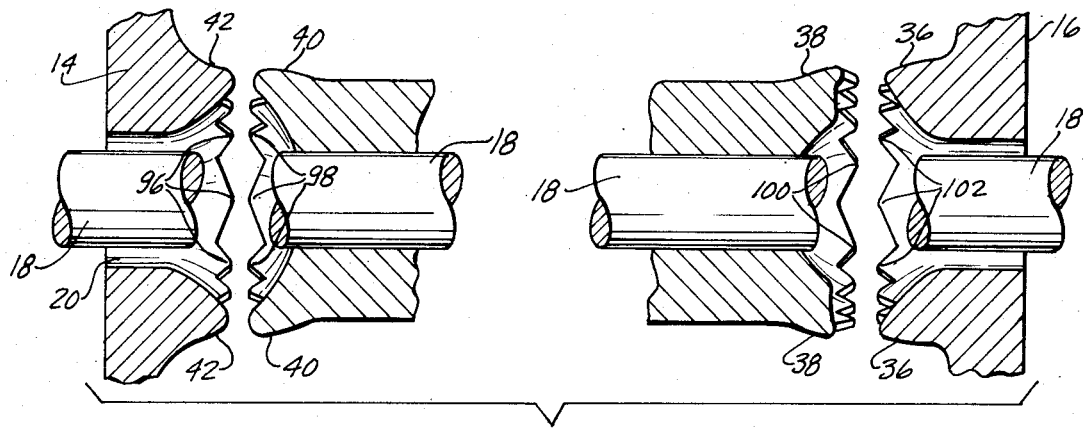
FIG. 7 is a broken-away cross-sectional view of a portion of another embodiment of the present invention.

FIG. 7 illustrates a modification of the bearing structure 10 shown in FIGS. 1 and 2 which utilizes the principles described in connection with FIGS. 4 through 6 to convert the structure 10 into a motor. In this modification, the ends 38 and 40 of the magnets 24 and 22 are toothed. Specifically, the ends 40 and 38 of the magnets have sawtooth-shaped teeth 98 and 100, respectively. Preferably, for reasons to be described below, these teeth are of the same size and pitch, but are 180° out of phase with one another.

Similar teeth are formed on the opposing end surfaces of the projections 42 and 36 of the end plates 14 and 16. The teeth on annular projection 42 are of the same size and pitch and are in phase with the teeth 98 on the opposed magnet end 40. The teeth 102 on the annular projection 36 are of the same size and pitch as the teeth 96 and also are in phase with those teeth. It is to be noted that the teeth 100 and 102 opposing one another at one end of the magnet structure are in phase with one another, whereas the teeth at the opposite end of the magnet 40 are 180° out of phase with one another. Thus, at all times, there will be a change in the flux coupling between the end plates and the magnets with each change in relative rotational position of magnets and end plates, and the motor effect described above will be obtained.

In a motor which has been built in accordance with FIG. 4 and successfully tested, the drive winding 80 has 400 turns of NO. 32 wire and a total resistance of 24 ohms, and the sense coil 82 has 10,000 turns of No. 38 wire and a total resistance of 12 ohms. The resistor 84 has a low resistance, e.g., 0.10 ohm. The amplifier 86 is an operational differential amplifier known as a type 709. The capacitor 92 has a capacitance of 0.5 microfarad. The resistor 88 has a resistance of 100 ohms.

The maximum rotational speed which can be produced by the motor effect described above is believed to be somewhat limited due to the fact that the movable magnet moves axially in order to generate the rotational forces necessary to produce the motor effect. This problem is alleviated by the further feature of the present invention which is illustrated in FIG. 3. In this alternative embodiment, a variable-frequency oscillator 72 is connected to the positive input terminal 59 of the operational amplifier 46. The magnets 22 and 24 and the end plates 14 and 16 have the notched shape shown in FIG. 7 and described above. The frequency of the oscillator 72 starts at a low frequency and is gradually increased. The rotation of the magnets 22 and 24 and the shaft 18 eventually fall into synchronism and phase lock with the oscillations of the oscillator 72. When this happens, the frequency of the oscillator 72 may be increased to drive the shaft 18 to a speed which is believed to be substantially higher than the maximum speed obtainable without the use of oscillator 72. Furthermore, the use of the oscillator provides a means for precise speed control of the motor.

Figure 8:
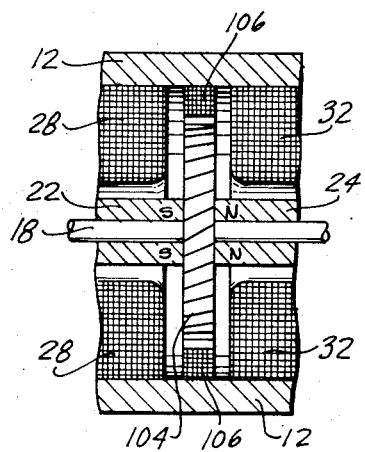
FIG. 8 is a partially schematic, broken-away cross-sectional view of another embodiment of the present invention.

A further embodiment of the present invention is shown in FIG. 8. In FIG. 8, the bearing structure 10 shown in FIGS. 1 and 2 has been modified by changing the separator plate 36 into a conventional wound rotor 104 such as a squirrel cage rotor and by providing a stator 106 which is secured on the inner periphery of the housing 12 so as to surround the rotor 104. The stator 106 can be one of a number of conventional, readily available stators which will develop a rotating magnetic field in response to single or poly-phase input currents and drive the rotor 104 at a suitable speed. As a specific example of a conventional drive system which can be used in this manner, the stator 106 and the rotor 104 can be those used in a conventional "pancake" synchromechanism.

The preferred materials for the magnets 22 and 24 shown in FIG. 1 include hard ferrite and Alnico 6, both of which are magnetic materials with high coercivity. The housing 12, the pole faces and the separator plate 26 are made of a highly permeable magnetic material such as soft steel.

The power amplifier 47 shown in FIG. 3 should have a relatively high power output rating, e.g., 30 watts, since relatively high levels of energy sometimes are required to be supplied by this amplifier. Amplifier 46 preferably is an integrated operational amplifier such as a type 709, which is readily available, for example, from Fairchild Instrument Corp.

Each of the above-described motors has significant advantages in that since the rotary member is suspended in space without any metal-to-metal contact, there is no bearing wear or losses to destroy or impair the usefulness of the motor. When the bearing structure is used in forming a gyroscope, the rotor, once it is driven up to full speed, will continue spinning without any significant loss of speed for a relatively long period of time. Furthermore, since there are no metal-to-metal or air bearings in the system, bearing lubricants need not be used, and air bearing losses are avoided. The result of this is that the motor can run successfully in a total vacuum, such as might be found in outer space, for example, or in high or low temperature environments. This is in contrast to conventional motors whose bearings might fail due to loss of lubricant when operating in a vacuum, or which will not operate at all in a vacuum if they use air suspension for the bearing system.

The above description of the invention is intended to be illustrative and not limiting. Various changes or modifications in the embodiments described may occur to those skilled in the art and these can be made without departing from the spirit or scope of the invention.

What is claimed is:

1. A magnetic bearing device for supporting a rotatable member, said device comprising first and second magnetically permeable support members, at least one of said support members extending around said rotatable member, said support members being spaced apart from one another, said rotatable member having a magnetically permeable portion near each of said support members, means including a pair of coils, each extending around a separate portion of said rotatable member, for developing an axially extending magnetic flux field between each of said support members and the adjacent permeable portion of said rotatable member, sensing means connected to said coils for sensing the flux changes in said permeable portions of said rotatable member, and compensating means connected to said coils for developing in said portions magnetic flux with a direction opposite to the direction of said flux changes to support said rotatable member axially and transversely in a position adjacent but out of contact with said support structures.

2. A bearing device as in claim 1 in which said compensating means includes said coils, which are connected in series one wound in one direction around one of said portions, and the other wound in the opposite direction around the other of said portions, and positive feedback amplifier means connected to energize said coils and simultaneously develop flux in opposite directions in said permeable portions of said rotatable member.

3. A bearing device as in claim 2 in which said sensing means includes a second pair of series-connected sensing coils, each wound in an opposite direction about one of said portions, and integrating negative feedback means connected between said sensing coils and said positive feedback amplifier means.

4. A bearing device as in claim 1 in which at least one of said support members has a hole through which one end of said rotatable member extends out of said bearing device, said rotatable member having pole faces extending radially outwardly from said rotatable member internally of said bearing device adjacent said support members.

5. A structure as in claim 1 including starting means for pulling said rotatable member away from one of said support members, said starting means including switch means actuated upon contact between said rotatable member and one of said support members, and de-activated upon elimination of such contact, said switch, when actuated, supplying electrical energy to said compensating means in a sense such as to create flux to pull said rotatable member away from the support member it is contacting.

6. A magnetic bearing structure for magnetically suspending and rotatably supporting a shaft, said structure comprising a pair of annular permanent magnets secured to said shaft, a magnetically permeable separator plate on said shaft and separating said magnets from one another, each of said magnets having a generally annularly-shaped end portion which protrudes axially from the main body of the magnet at a position spaced radially outwardly from said shaft, a housing of magnetically permeable material, said housing having two ends, each with an opening through which one end of said shaft extends, an annular protrusion at each of said openings, each of said protrusions having a portion extending axially toward and adjacent one of said magnet end portions, two drive windings and two sense windings wound around but spaced from said shaft, there being one drive winding and one sense winding on each side of said separator plate, and positive feedback amplifier means for energizing said windings so as to axially balance and maintain said shaft magnetically in a position of axial equilibrium.

7. Apparatus for supporting a magnetically permeable body by magnetic forces, said apparatus comprising bias means for applying to said body a magnetic bias flux forming opposite magnetic poles in said body, shunt means forming a shunt path made of magnetically permeable material and having portions adjacent each of said poles, and balancing means for sensing flux changes in said body and developing in said body balancing flux in a direction opposite to the direction of said flux changes so as to support said body magnetically in a position with gaps between said body and said portions of said shunt means, said balancing means including means for simultaneously increasing the flux across one of said gaps and decreasing the flux across the other of said gaps.

8. Apparatus as in claim 7 in which said balancing means includes a pair of coils, one around one end of said body, and the other around the other end of said body, and means intermediate said coils for dividing said shunt path into two separate shunt paths.

9. An electric motor, said motor comprising, in combination, a rotatable member, magnetic bearing means for said rotatable member, said bearing means comprising a support member extending around said rotatable member, and magnetic suspension means for magnetically suspending and holding said rotatable member against axial and transverse movement relative to said support member and for holding said rotatable member out of contact with said support member, and magnetic drive means for rotating said rotatable member, said suspension means including means for developing an axial magnetic flux field between said support member and a portion of said rotatable member, means for changing the pattern of said flux field with the relative rotational positions of said rotatable member and said support member and said pattern changing means includes rotationally asymmetrical pole faces for said support member and said portion of said rotatable member.

10. A motor as in claim 9 in which said pattern changing means includes means for supplying oscillating magnetic flux to said flux field.

11. A motor as in claim 9 in which said assymmetrically-shaped pole faces are toothed.

12. A motor comprising drive means for magnetically rotating a magnetically permeable body, and magnetic apparatus for rotatably supporting said body, said apparatus comprising bias means for applying to said body a magnetic bias flux forming opposite magnetic poles in said body, shunt means forming a shunt path made of magnetically permeable material and having portions adjacent each of said poles, balancing means for sensing flux changes in said body and developing in said body balancing flux in a direction opposite to the direction of said flux changes so as to support said body magnetically in a position with gaps between said body and portions of said shunt means and said drive means includes rotationally asymmetrical pole faces for said body and the adjacent portions of said shunt means, the asymmetry of one pole face and the opposed shunt portion being out of phase with the asymmetry of the other pole face and shunt portion.

13. A motor as in claim 12 in which said balancing means includes means for simultaneously increasing the flux across one of said gaps and decreasing the flux across the other of said gaps, and said drive means includes means for applying oscillating flux across said gaps.

14. An electrical motor comprising a stationary magnetic member, a movable magnetic member adjacent said stationary magnetic member, first flux means for creating between said movable and stationary magnetic members a magnetic flux field whose pattern changes with changes in the rotational positions of said movable and said stationary members relative to one another, second flux means for creating between said members a variable magnetic flux field to compensate for magnetic force variations between said members and maintain them adjacent but out of contact with one another and said first flux flux means includes rotationally asymmetrical pole faces between said movable and stationary members.

15. A motor as in claim 14 in which said pole faces are rectangular.

16. A motor as in claim 14 in which said second flux means includes a coil around said movable member, positive feedback amplifier means for energizing said coil, and integrating negative feedback damping means for said amplifier means.

* * * * *